US006296238B1

(12) United States Patent
Lund-Andersen

(10) Patent No.: US 6,296,238 B1
(45) Date of Patent: Oct. 2, 2001

(54) DEVICE FOR THE DAMPING OF VIBRATIONS BETWEEN OBJECTS

(76) Inventor: Birger Lund-Andersen, Hoeddalen 18, N-1614 Fredrikstad (NO)

( * ) Notice: Subject to any disclaimer, the term of this patent is extended or adjusted under 35 U.S.C. 154(b) by 0 days.

(21) Appl. No.: 09/297,657
(22) PCT Filed: Nov. 8, 1996
(86) PCT No.: PCT/IB96/01198
 § 371 Date: Jun. 24, 1999
 § 102(e) Date: Jun. 24, 1999
(87) PCT Pub. No.: WO98/21500
 PCT Pub. Date: May 22, 1998
(51) Int. Cl.[7] ................................................ B60G 11/22
(52) U.S. Cl. ............................................. 267/294; 188/268
(58) Field of Search .................................. 267/294, 292, 267/153, 293, 114.11; 188/268; 280/275–277, 279, 283, 284, 280; 369/263, 75.1, 258, 75.2

(56) References Cited

U.S. PATENT DOCUMENTS

| Re. 24,654 | * | 6/1959 | Sheets | 267/35 |
| 28,619 | * | 6/1860 | Vose | 267/293 |
| 4,387,453 | | 6/1983 | Zolt . | |
| 4,436,178 | | 3/1984 | Gieger . | |
| 5,231,541 | | 7/1993 | Han . | |
| 5,433,422 | | 7/1995 | Ross et al. . | |
| 5,460,357 | * | 10/1995 | Stewart | 267/294 |

FOREIGN PATENT DOCUMENTS

| 39 14 303 | 10/1990 | (DE) . |
| 2 278 974 | 12/1994 | (GB) . |
| 03 283173 | 12/1991 | (JP) . |
| WO 95/28577 | 10/1995 | (WO) . |

OTHER PUBLICATIONS

Maurice–A. Julien, Examen Synoptique, Sur Leurs Modèles Communs, Des Problèmes De Suspension ÀDeux Etages Et D'Amortissement Dynamique Des Vibrations, Journal S.I.A., Oct. 1958, pp. 1–15.

* cited by examiner

Primary Examiner—Christopher P. Schwartz
Assistant Examiner—C. T. Bartz
(74) Attorney, Agent, or Firm—Young & Thompson

(57) ABSTRACT

The device dampens vibrations between objects, especially for preventing the transfer of vibrations from a primary object subjected to vibrations, to a vibration-sensitive secondary object. The secondary object is non-rigidly supported by a damping body, which has the same or essentially the same size of mass as the secondary object, and which in turn is non-rigidly supported on the primary object.

17 Claims, 4 Drawing Sheets

DEVICE FOR THE DAMPING OF VIBRATIONS BETWEEN OBJECTS

FIELD OF THE INVENTION

The present invention relates to a device for the damping of vibrations between objects, especially for preventing the transfer of vibrations from a primary object, subjected to vibrations, to a secondary object which is sensitive to vibrations.

In, for example, playback apparatus for audio and video discs with optical reading of rotating information-carrying discs and also in analogue record players, the functions of the respective optical laser pickup units, stylus pickups, gear drives and turntable details are extremely sensitive to vibrations from the surroundings.

SUMMARY OF THE INVENTION

An object of the invention is to suggest an improved device for preventing undesired vibrations being transferred to vibration-sensitive objects, i.e. to damp away or extinguish such vibrations. According to a first aspect of the invention, this function is solved in a device of the type mentioned in the introduction through the secondary vibration-sensitive object being non-rigidly supported by a damping body itself non-rigidly supported on the primary object, the damping body having the same or essentially the same size mass as the secondary object. It has been shown that placing a non-rigidly supported damping body between on the one side a supported object, which is to be protected from vibrations, and on the other side a vibrating object, wherein the mass of the damping body is the same or essentially the same as the mass of the supported object, provides an effective interruption in the transfer of vibrations to the supported object. Through such adjustment of the mass of the damping body to the mass of the supported object, they will dynamically be in an antiphase relationship to each other in such a way that the vibrations from below are extinguished by the damping body so that the supported object is not influenced by the vibrating body below it.

This principle for damping away vibrations is also applicable in the opposite case, where the supported object is a producer of vibrations, e.g. a compressor, washing-machine of the like and where the underlayer, e.g. a support or floor, is to be protected against vibrations.

BRIEF DESCRIPTION OF THE DRAWINGS

The invention is described in more detail below with reference to a plurality of embodiments in the accompanying drawings, in which.

DETAILED DESCRIPTION OF THE PREFERRED EMBODIMENTS

Figure 1:
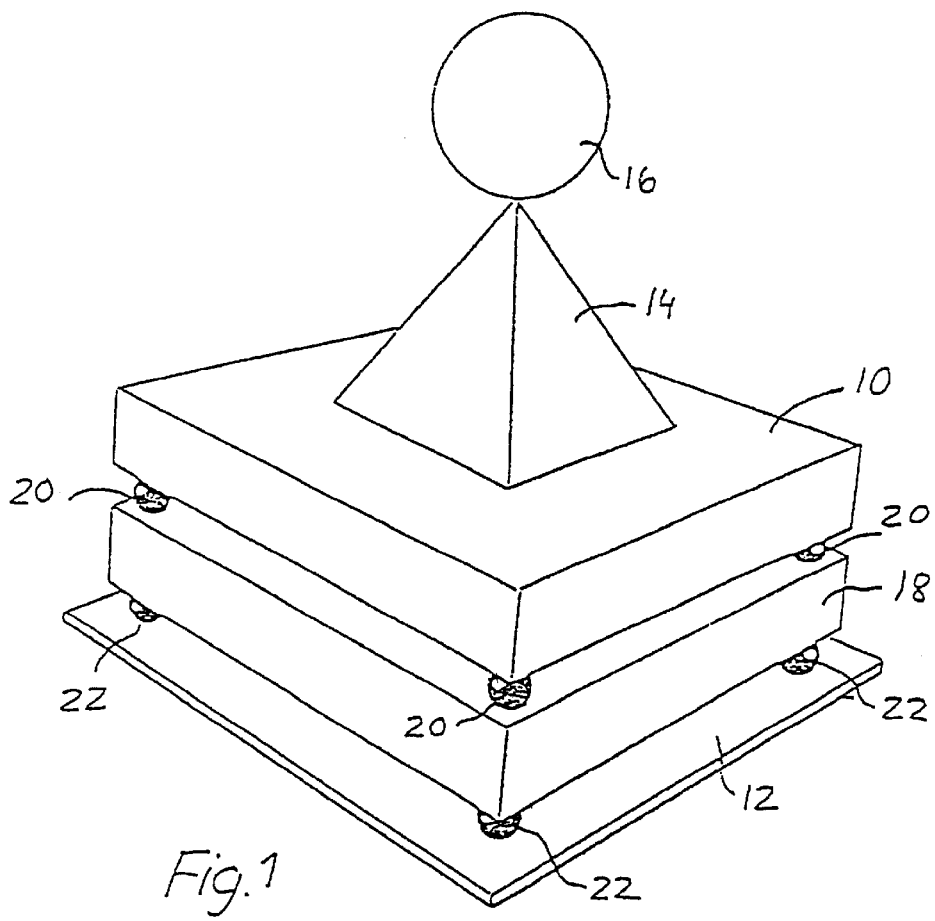
FIG. 1 is a schematic perspective view of a embodiment showing the principle of a device according to the invention.

FIG. 1 shows a general example of an embodiment of the vibration-damping device according to the present invention. 10 relates to an object, which is sensitive to vibrations and which it is desired to hold completely free from vibrations which can occur in the underlayer 12 upon which the object 10 is supported. Two parts 14 and 16 between which no vibrations are allowed to occur, are shown symbolically on the object 10. In order to prevent vibrations in the underlayer 12 being transferred to the object 10, it is suggested according to the invention that the object be supported non-rigidly on the damping body 18, which has the same or substantially the same mass as the object 10 and which in its turn is non-rigidly supported on the underlayer 12. By a suitable selecting and balancing of the resilient elements 20 between the object 10 and the damping body 18, and the resilient elements 22 between the damping body 18 and the underlayer 12, it is possible to effectively prevent vibrations being transferred from the underlayer 12 to the object sensitive to vibrations 10. In this way the damping body 18 will work in an antiphase relationship to the vibrations in the underlayer so that these are damped out or extinguished.

Figure 1A:
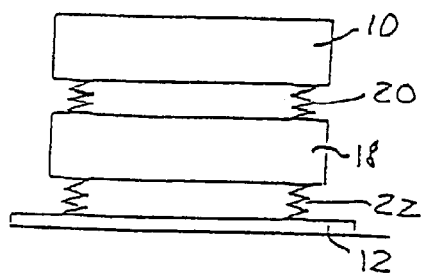
FIGS. 1a–1g show different types of resilient means between the damping body and the supported object.
Figure 1B:
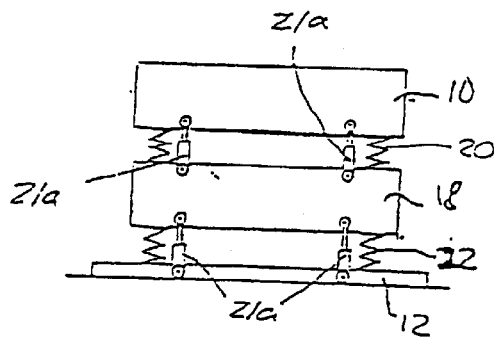
Figure 1C:
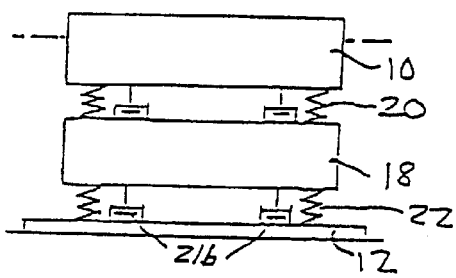
Figure 1D:
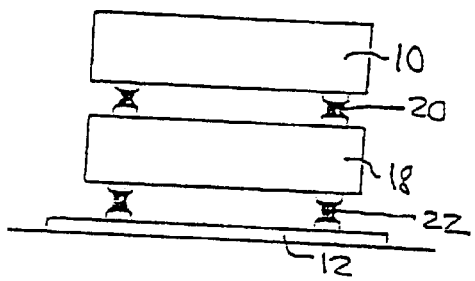
Figure 1E:
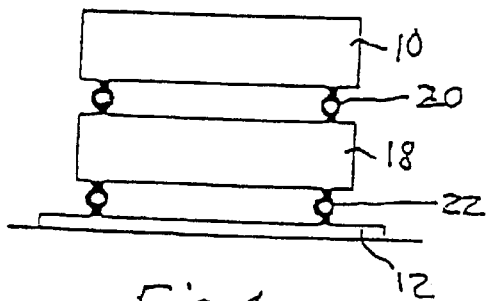
Figure 1F:
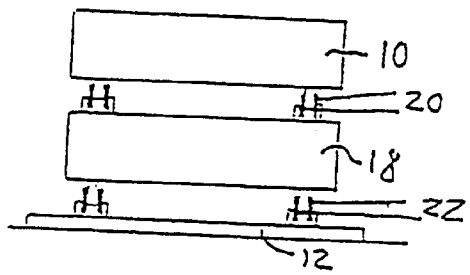
Figure 1G:
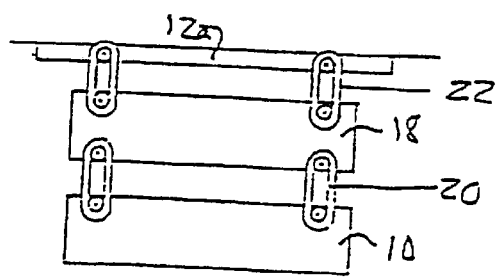

FIGS. 1a–1g show schematically different forms of resilient elements between the damping body 18 and the object 10, where FIGS. 1a–1c show resilient elements 20, 22 of the helical spring type, which are complemented with damping means 21a, 21b in FIG. 1b resp. 1c. The resilient elements 20, 22 in FIG. 1d are formed from solid hourglass-shaped rubber bodies, while those in FIGS. 1e and 1f are formed of hollow or ring-shaped rubber elements. FIG. 1g shows an embodiment where the object 10, which is to have its vibrations damped, is suspended in the damping body 18 by resilient elements 20 in the shape of oval rubber rings. The damping body 18 in turn is suspended in a carrier 12a by means of similar oval rubber rings 22. Naturally the resilient elements 22, which support approximately twice as much load as the resilient elements 20, must be more powerfully dimensioned in order to give similar spring characteristics to the object 10 and the damping body 18.

This vibration-damping principle can be put into practice in many fields. Reference is made below to several conceivable suitable application examples.

Figure 2:
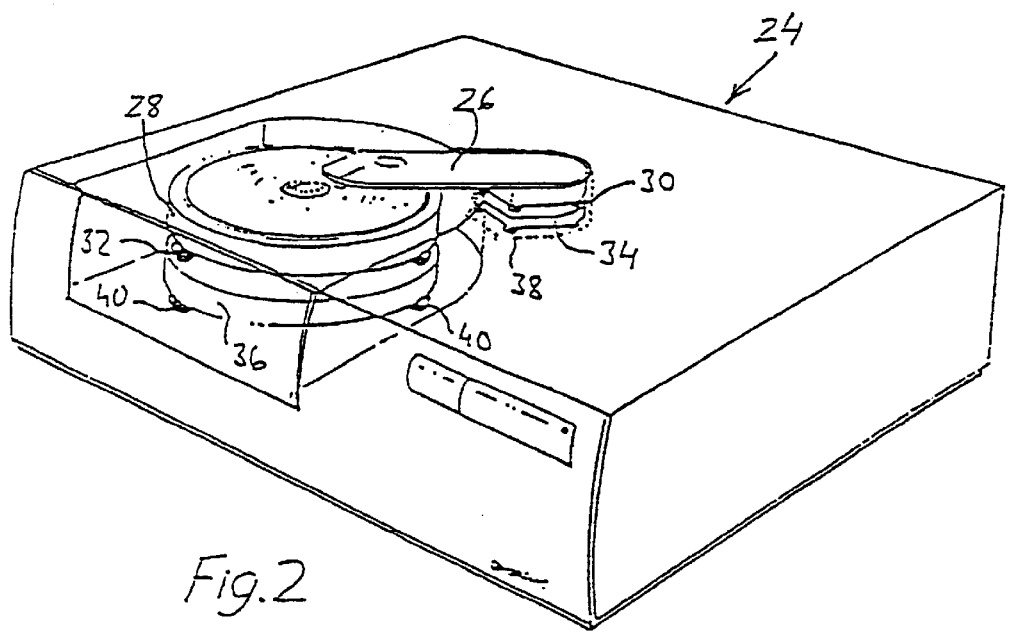
FIG. 2 shows schematically an application of the invention on a gear drive and laser pickup unit of a CD-player.

FIG. 2 shows a CD-player 24 where both a laser pickup arm 26 and a gear drive unit 28 in the player are non-rigidly supported by means of elastic elements 30 resp. 32 on a respective damping body 34, 36, which has the same mass as the arm 26 resp. the unit 28 and in turn is non-rigidly supported in the body or chassis of the CD-player 24 by way of elastic elements 38 resp. 40. The elastic elements 30, 32 and 38, 40 suitably comprise elastic rubber elements shaped and adapted to give the supported parts 26, 28 the same spring characteristics as their respective damping bodies 34, 36. By means of such a constructive solution, the vibration-sensitive bodies 26, 28 of the CD-player 24 can be completely isolated from vibrations of normal range and magnitude coming from below. By analogy with this embodiment the invention can naturally also be adapted to CD-ROM-players.

Figure 3:
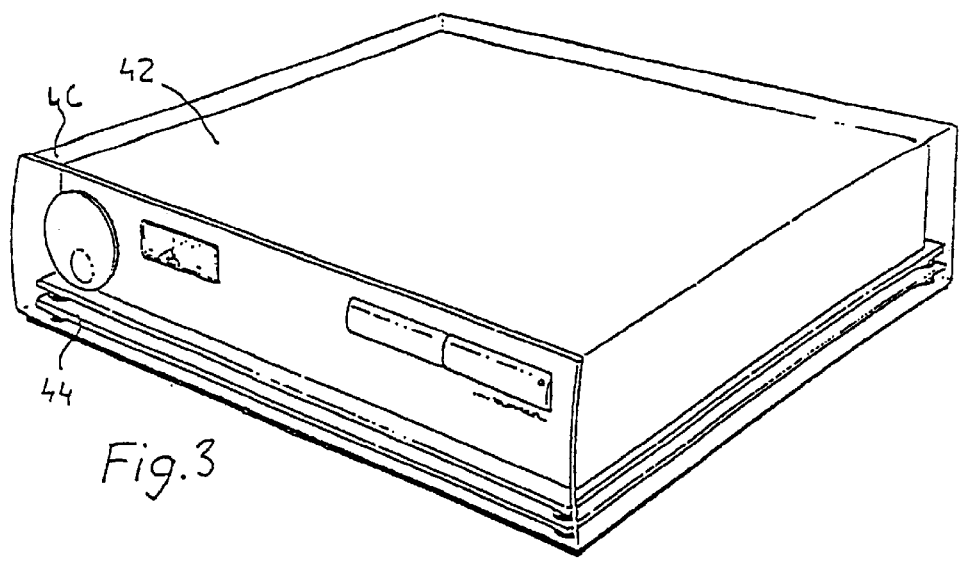
FIG. 3 shows an embodiment where a complete vibration-sensitive apparatus is enclosed and supported in a casing over a damping arrangement according to the invention.

FIG. 3 shows an embodiment where a complete HiFi-apparatus 42, e.g. a CD-player, is non-rigidly supported on a underlayer surface 44 acting as a damping body, which has the same mass as the apparatus 42 and which in its turn is non-rigidly supported in a casing 46 which surrounds the whole of the apparatus 42.

Figure 4:
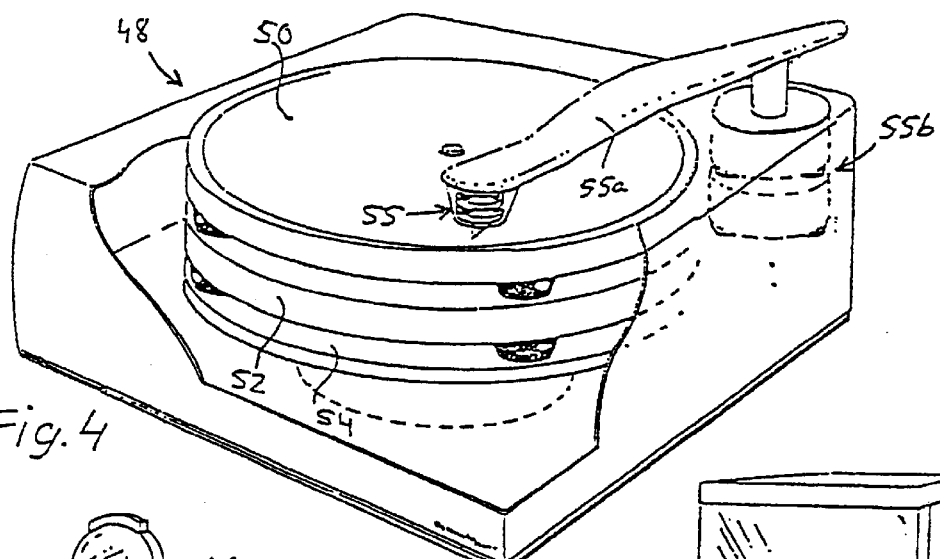
FIG. 4 shows schematically an analogue record player, where the damping arrangement according to the invention is applied on the one hand to the turntable, on the other hand to the stylus pickup supported on the tone arm.

FIG. 4 shows an analogue record player 48, in which the present invention has been applied in three different places. Thus, the turntable 50 of the record player 48 is non-rigidly supported by a camping body disc 52 which can rotate together with the turntable 50 and which has the same or essentially the same mass as the turntable including a LP-record lying on it. The damping disc 52 in turn is non-rigidly supported by a drive disc 54 which can produce vibrations. The stylus pickup 55 can also be vibration-insulatingly supported in an analogue manner as well as also the bearing support 55b of the tone arm 55a.

Figure 6:
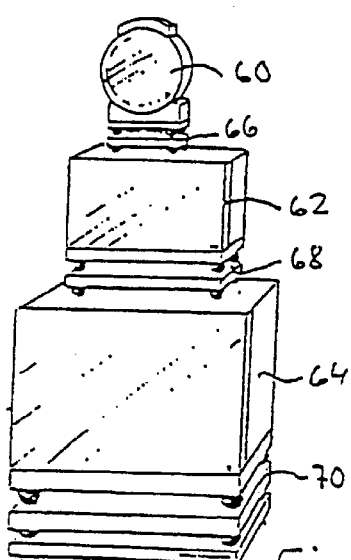
FIGS. 5 & 6 show schematically a damping arrangement according to the invention applied to loudspeakers.
Figure 5:
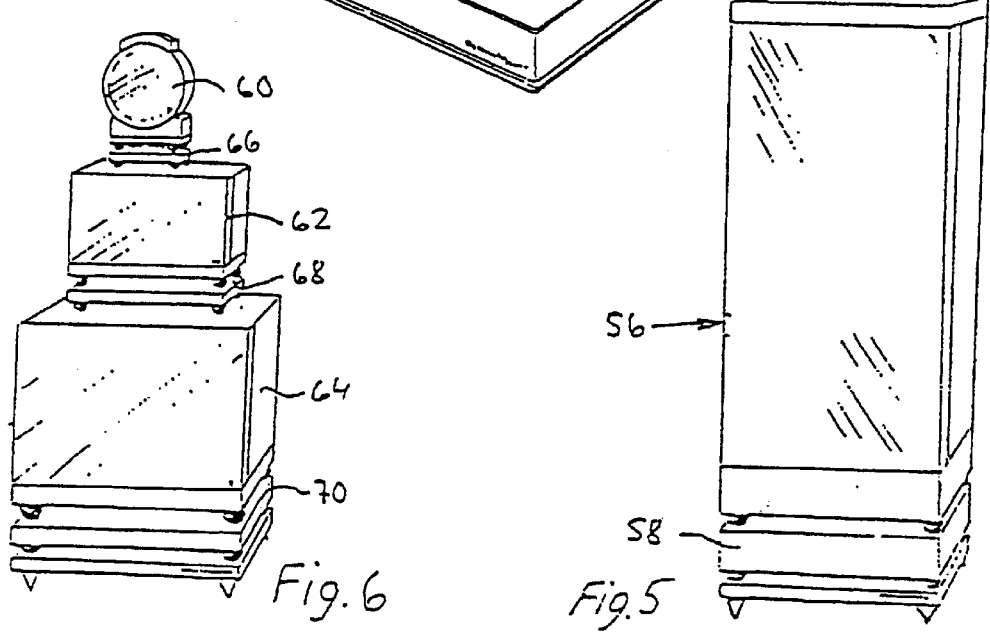

FIGS. 5 and 6 show the present invention adapted to loudspeakers where FIG. 5 shows a large multi-way loudspeaker 56, non-rigidly supported on a, in turn non-rigidly supported, damping body 58 of the same or essentially the same mass as the loudspeaker 56. FIG. 6 shows separate tweeter, mid-range and woofer units 60, 62 resp. 64, which are non-rigidly supported on respective damping bodies 66, 68 and 70 according to the invention.

Figure 7:
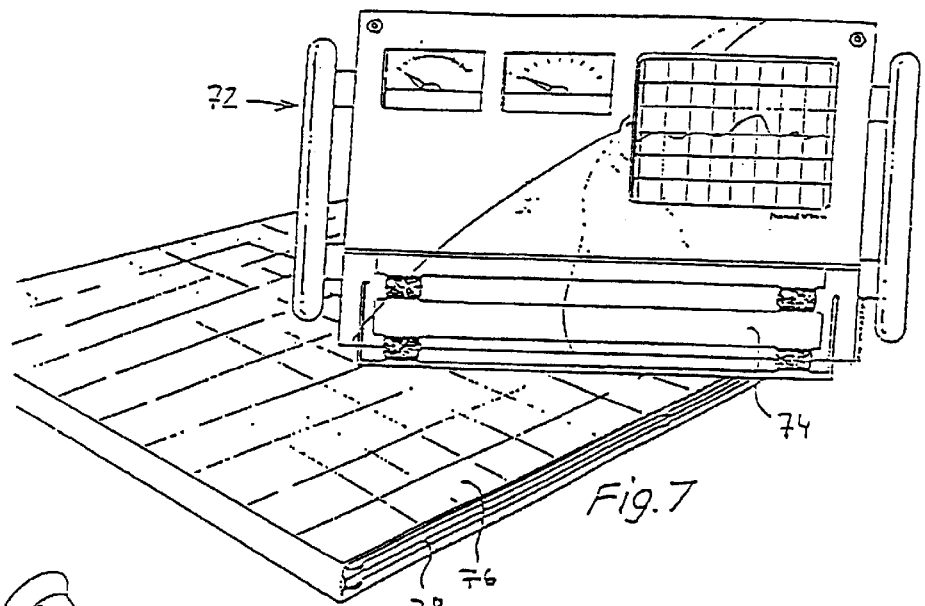
FIGS. 7–9 show further application examples of the damping arrangement according to the invention.

FIG. 7 shows both an instrument 72 with a vibration-insulating damping body 74 according to the invention and a drawingboard top 76 with a similar vibration-damping, elastically supported damping slab 78.

Figure 8:
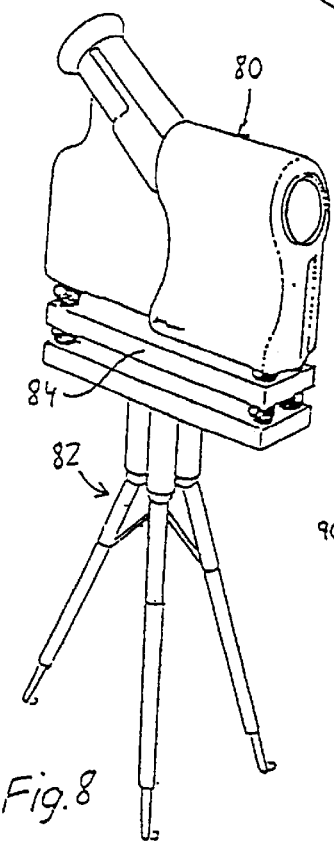

Furthermore, FIG. 8 shows a vibration damper according to the present invention adapted for a laser measuring instrument 80, which in non-rigidly supported on a stand 82 by means of an intermediate, non-rigidly supported damping body 84 of the same or essentially the same mass as the measuring instrument 80.

Figure 9:
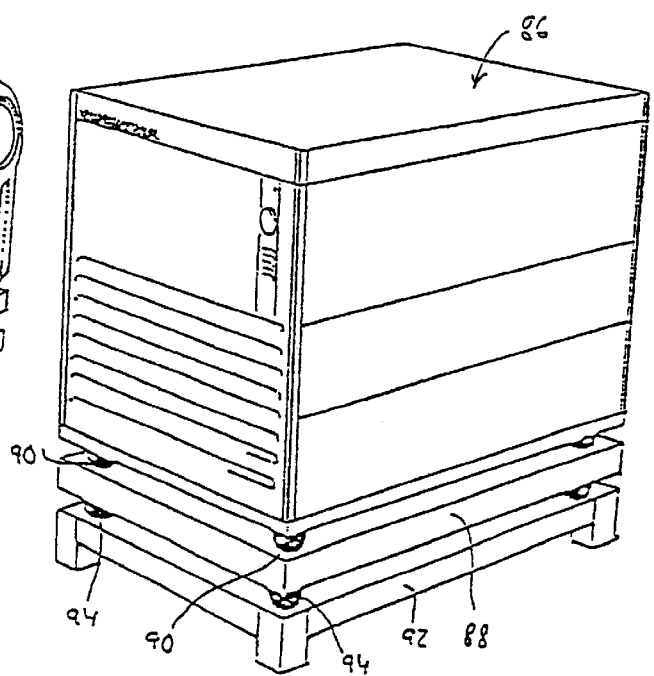

The present invention is also adaptable in the cases where it is desirable to prevent vibrations from a supported object being transferred to an underlying support or floor. FIG. 9 shows an example where a vibration-producing compressor 86 is non-rigidly supported on a damping body 88 by way of elastic elements 90, which damping body 88 has the same or essentially the same mass as the compressor 86 and is non-rigidly supported on an underlayer or support 92 via elastic elements 94.

The vibration damping arrangement according to the present invention is fundamentally applicable in many other areas of use within the scope of the following claims.

What is claimed is:

1. Device for preventing a transfer of vibrations from a vibrating primary object to a vibration-sensitive secondary object, said secondary, vibration-sensitive object being resiliently supported by a damping body, which has the same or substantially the same size of mass as said secondary object, and which is resiliently supported by said primary object and wherein said primary and secondary objects comprise audio or video components.

2. Device according to claim 1, wherein said secondary object and said damping body are supported by means of resilient means.

3. Device according to claim 1, wherein said secondary object is a unit in an apparatus for optical playback of information carriers.

4. Device according to claim 3, wherein said unit is an element which supports a laser pickup.

5. Device according to claim 3, wherein said unit is a gear drive for the rotation of an information carrying disc.

6. Device according to claim 3, wherein said unit is a complete chassis with contents and is supported on said damping body in a common casing for said chassis and said damping body.

7. Device according to claim 1, wherein said secondary object is a record turntable for an analogue record player, wherein said record turntable is non-rigidly supported by a co-rotating damping body, which in turn is non-rigidly supported by a rotatable driving disc.

8. Device according to claim 1, wherein said secondary object is a stylus pickup unit, which is non-rigidly supported on said camping body which in turn is non-rigidly supported in the tone arm for an analogue record player.

9. Device according to claim 1, wherein said secondary object is a tone arm for an analogue record player.

10. Device according to claim 1, wherein said secondary object is a loudspeaker.

11. Device according to claim 1, wherein said secondary object is a loudspeaker unit comprising a woofer, a mid-range loud-speaker and a tweeter, which are disposed on top of each other.

12. A device for preventing a transfer of vibrations from a vibrating primary object to a vibration-sensitive secondary object, said vibration-sensitive secondary object being resiliently supported by a damping body having the same size mass as said secondary object and which is resiliently supported by said primary object, and wherein said secondary object comprise electronic components.

13. Device according to claim 12, wherein said secondary object is a measuring instrument.

14. Device for preventing a transfer of vibrations from a vibrating primary object to a vibration-sensitive secondary object, wherein said primary object subjected to vibrations is resiliently supported by a damping body, which is resiliently supported by said secondary object and which has the same or substantially the same size of mass as said primary object and wherein said primary and secondary objects comprise electrical components.

15. Device according to claim 14, wherein said primary object and said damping body are supported by means of resilient means.

16. Device according to claim 14, wherein said primary object is a vibration-producing machine.

17. Device according to claim 14, wherein said secondary object is a stand.

* * * * *